United States Patent [19]
Mitchell

[11] Patent Number: 4,948,513
[45] Date of Patent: Aug. 14, 1990

[54] METHOD FOR CONTROLLING OVERSPRAY IN PAINT SPRAY BOOTHS

[75] Inventor: David B. Mitchell, Palatine, Ill.

[73] Assignee: W. R. Grace & Co.-Conn., New York, N.Y.

[21] Appl. No.: 199,984

[22] Filed: May 27, 1988

[51] Int. Cl.$^5$ .............................................. C02F 1/56
[52] U.S. Cl. ................................... 210/705; 210/712; 210/725; 210/727; 210/728; 55/85
[58] Field of Search .................. 55/84, 85; 134/38; 210/705, 712, 725, 727, 728, 730, 733–736; 427/331

[56] References Cited

U.S. PATENT DOCUMENTS

| | | | |
|---|---|---|---|
| 2,345,543 | 3/1944 | Wohnsiedler et al. | 260/72 |
| 2,485,079 | 10/1949 | Wohnsiedler et al. | 260/29.4 |
| 2,820,777 | 1/1958 | Suen et al. | 260/89.7 |
| 3,288,770 | 11/1966 | Butler | 260/88.3 |
| 3,515,575 | 6/1970 | ARnold | 55/84 |
| 3,718,693 | 2/1973 | Samour et al. | 260/561 A |
| 3,738,945 | 6/1973 | Panzer et al. | 260/2 BP |
| 3,751,451 | 8/1973 | Samour et al. | 260/485 H |
| 3,780,092 | 12/1973 | Samour et al. | 260/482 R |
| 3,839,419 | 10/1974 | Samour et al. | 260/485 H |
| 3,861,887 | 1/1975 | Forney | 55/19 |
| 3,879,447 | 4/1975 | Samour et al. | 260/482 R |
| 3,898,274 | 8/1975 | Samour et al. | 260/501.13 |
| 3,925,442 | 12/1975 | Samour et al. | 260/459 |
| 3,928,423 | 12/1975 | Samour et al. | 260/482 P |
| 3,936,492 | 2/1976 | Samour et al. | 260/482 R |
| 3,953,330 | 4/1976 | Tonkyn et al. | 210/736 |
| 3,990,869 | 11/1976 | Forney | 55/19 |
| 3,990,986 | 11/1976 | Gabel et al. | 252/315 |
| 4,002,490 | 1/1977 | Michalski et al. | 134/38 |
| 4,055,495 | 10/1977 | Gabel et al. | 210/728 |
| 4,440,647 | 4/1984 | Puchalski | 210/712 |
| 4,504,395 | 3/1985 | Harpel et al. | 210/712 |
| 4,548,967 | 10/1985 | Brown et al. | 524/56 |
| 4,554,026 | 11/1985 | Cosper et al. | 134/38 |
| 4,558,080 | 12/1985 | Quamme et al. | 524/72 |
| 4,563,199 | 1/1986 | Lindenberger et al. | 55/85 |
| 4,564,464 | 1/1986 | Harpel et al. | 252/181 |
| 4,600,513 | 7/1986 | Mizutani et al. | 310/712 |
| 4,629,572 | 12/1986 | Lietz et al. | 210/714 |
| 4,637,824 | 1/1987 | Pominville | 55/85 |
| 4,656,059 | 4/1987 | Mizuno et al. | 210/729 |
| 4,686,047 | 8/1987 | Arots | 210/712 |
| 4,715,962 | 12/1987 | Bhattacharyya et al. | 210/708 |
| 4,753,738 | 6/1988 | Huang | 210/727 |

FOREIGN PATENT DOCUMENTS

| | | | |
|---|---|---|---|
| 56-126480 | 10/1981 | Japan | 210/734 |
| 57-30510 | 2/1982 | Japan | 210/734 |
| 2185739A | 7/1987 | United Kingdom | |

Primary Examiner—Peter Hruskoci
Attorney, Agent, or Firm—James P. Barr

[57] ABSTRACT

A novel polymer and treatment scenario which considerably improves detackification of paint overspray consisting of high solids enamel, epoxy resin, or polyurethanes in the wash water or paint spray booths is disclosed comprised of:
(i) a hydrophilic-lipophilic copolymer in combination with a modified tannin and/or
(ii) a diallyldimethylammonium chloride polymer in combination with a modified tannin.

35 Claims, 1 Drawing Sheet

METHOD FOR CONTROLLING OVERSPRAY IN PAINT SPRAY BOOTHS

FIELD OF THE INVENTION

This invention relates to treatment of paint spray booth wastes and in particular to treatment of waste paint accumulated in spray booth process water using treatment formulations which prevent agglomeration of paint spray particles.

BACKGROUND OF THE INVENTION

Commercial paint spraying operations are typically performed in spray painting booths. During these operations, less than half of the paint used may actually coat the surface to be painted, with the remainder representing overspray. In the spray application of polyurethanes, epoxy resins, lacquers, enamels, and additional coatings, it is normally necessary to trap the oversprayed coating materials in some way to avoid their building up on the walls and exhaust system surfaces of the spray booth. In many large industrial installations, including especially auto body painting systems, this is accomplished by the use of water curtains on the interior booth walls, whereby the oversprayed coating material is trapped in water which cascades down the walls of the booth and lies underneath it. Normally this water is recirculated over the walls from a reservoir of water underneath the booth or in close proximity to it by means of pumps which are capable of moving a large flow of water through large diameter pipes. However, the agglomeration and accumulation of live coating material in the water supply of these installations results in serious problems, such as blockage of the pipes and pumps which circulate the water, and a build-up of paint on the walls of the booth beyond the water curtain. As more and more coating material is sprayed in the booth, the material removed from the air builds up in the water in the form of a tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the bottom of the water reservoir also creates a serious problem when the system is periodically cleaned out, much effort being required to remove the heavy build-up of coating material on the bottom of the reservoir.

It is, therefore, desirable to treat the water in the booth in such a way as to render the oversprayed coating material free of stickiness and tackiness so that it will readily separate itself from the water, not adhere to the curtain walls, pipes, pumps and other internals of the spray booth system, and remain as a detackified floating sludge.

One approach to detackification has been to combine certain polymeric materials with amphoteric metals. Thus, for example, U.S. Pat. No. 3,861,887 discloses treatment of paint booth wash water with a blend of polycationic water dispersible polymer with a water-soluble salt of an amphoteric metal to reduce the tackiness of paint. One problem with this approach is that use of metals, such as zinc, can create additional disposal concerns for the wastewater and sludge recovered from it.

Another approach has been to use clay-based treatment. For example, U.S. Pat. No. 4,504,395 discloses that certain hectorite clays can be effectively used to detackify oversprayed paint. A problem with this approach is that the sludge produced using clays can be difficult to dewater, resulting in larger volumes of potentially hazardous materials requiring haul-out to a secure landfill.

Other approaches using various treatments have also reportedly been considered. However, there remains a need for effective paint spray treatment which detackifies paint overspray and which does not aggrevate waste sludge disposal problems. Moreover, some paint spray facilities have found that predilution of paints with various organic solvent combinations, for example, methylethyl ketone, toluene, xylene, etc. can be practiced advantageously to improve the coating finish and economize upon paint wastage, and paint spray treatment which can effectively detackify overspray containing prediluted paint formulations can be especially valuable.

SUMMARY OF THE INVENTION

In accordance with this invention, oversprayed paint particles in paint spray booth water is detackified by using in combination: (a) a first component selected from the group consisting of reaction products of a condensed tannin with both an aldehyde and an amino compound; and (b) a second component selected from the group consisting of (i) polymers derived from certain hydrophilic-lipophilic quaternary ammonium repeat units, and (ii) certain diallyldialkyl quaternary ammonium polymers. This combination provides extremely effective control of paint spray booth wastes, particularly at a pH between about 8 and about 11, and can serve as the basis for a paint spray control program which is organic in nature. Indeed, the preferred combination is free of clays which can present considerable dewatering problems, and free of amphoteric metals, such as zinc, which can present waste disposal concerns. Hydrolyzed polyacrylamide polymer can be used to enhance coagulation and/or dewatering. However, the combination of this invention, by itself, can often provide a sludge which is readily dewatered, particularly when used to control high solids enamel paints which have been prediluted with an organic solvent formulation.

It is an object of this invention to inhibit the accumulation of paint within the eliminators, recirculation pumps, sludge tanks, water curtains, and other equipment of paint spray booth apparatus.

It is another object of the invention to provide for improved removal of detackified paint from an aqueous system.

It is a further object of this invention to provide a treatment for paint spray facilities employing paints which have been prediluted with organic solvent formulations.

It is still another object of this invention to provide a detackified sludge which is readily dewatered.

It is yet another object of this invention to provide for detackification which can be practiced without relying on toxic metals as essential components.

These and other objects and advantages of the present invention will become apparent from the following detailed description of the invention.

DETAILED DESCRIPTION OF THE INVENTION

Figure 1:
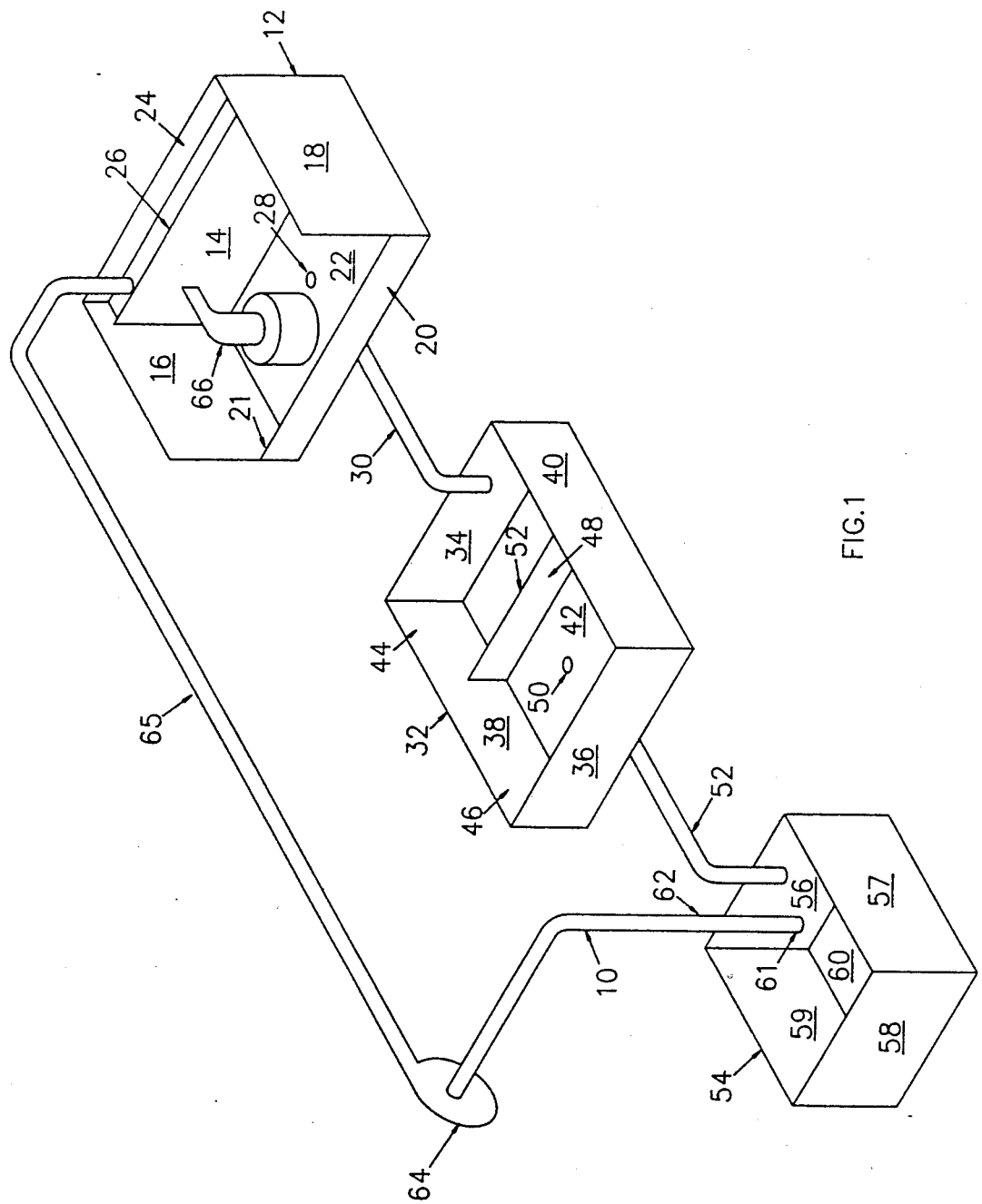
FIG. 1 is a schematic isometric drawing of an apparatus used for evaluating control of paint overspray.

The present invention is directed to the use of two cationic components, each comprising selected organic compounds, in combination to achieve advantageous detackification of paint spray booth wastes. One of those components is selected from certain modified tannins. The modified tannin compounds which may be used in this invention are those formed by reacting condensed tannins such as extracts from quebracho wood or wattle bark, which are polyphenolic, with both an aldehyde, particularly formaldehyde, and an amino compound such as monoethanolamine, ammonia, and ammonium salts such as ammonium chloride. The reaction between formaldehyde and amino compounds and a compound, such as a phenolic compound, which contains reactive hydrogen atoms is known as the Mannich Reaction. The molecular weight of the preferred modified tannin materials is considered to be within the range of 5,000 to 50,000. Preferably, the tannin-based materials used in this invention have a charge density of between about 0.7 and about 5.0 milliequivalents per gram (meq/g).

Preferably, the tannin-based component utilized in this invention is made in accordance with disclosure of U.S. Pat. No. 4,558,080, which is hereby incorporated in its entirety by reference. Such a component uses condensed polyphenolic tannins and is prepared under slightly acidic conditions where the pH is less than 7 and where the molar ratio of the primary amine from the amino compound to the tannin repeating unit is from about 1.5:1 to about 3.0:1. To form a tannin-based component having a long shelf life, the reaction mixture is heated at a temperature of from about 150° to about 200° Fahrenheit until a reaction product forms which has an intermediate viscosity within a "key intermediate viscosity range" and the reaction is then terminated by external cooling, by adding quench water, and by adding acid. The "key intermediate viscosity range" is determined experimentally for each flocculant reaction system and is generally within a narrow range between about 2 and about 100 cps when measured at 180° Fahrenheit on a Brookfield LVT viscosimeter. The reaction is terminated by external cooling, by adding quench water, and by adding acid. The solids content of the resultant liquid flocculant is preferably about 20% to about 60% by weight and the pH is preferably less than 3.0. Preferably an antifoamer material such as silicon anti-foamer exemplified by Silicone B made by Dow Chemical Co., a mineral seal oil, or a high molecular weight alcohol is added to prevent excessive foaming.

U.S. Pat. No. 4,558,080 describes the production of a tannin-based flocculant using monoethanolamine as the amino compound and formaldehyde as the aldehyde. As described therein, a reactor containing 130.75 grams of de-ionized water was preheated to 150° F. Gradually 125.75 grams of Mimosa extract, available as a spray-dried tannin powder sold by Canadian Packers, Ltd., was gradually added while stirring. The temperature was maintained at about 130° to 140° Fahrenheit. After complete dissolution, the material was cooled to 110° Fahrenheit. Then 0.15 grams of a silicon antifoamer, Silicone B made by Dow Chemical, was added.

To the aqueous tannin solution, 47.65 grams of monoethanolamine was added to yield a primary amine to tannin ratio of 1.86:1 while mixing, and the temperature of the reaction mixture was allowed to rise to 130° Fahrenheit and it was maintained at this temperature until all of the amine was added. In order to maintain the acid conditions of the reaction mixture 80 grams of a 32% active hydrochloric acid was added to bring the pH in the range of 6.4 to 6.7 and the temperature was allowed to rise to 140° Fahrenheit. Upon forming its initial tannin/amine solution, the mixture was then cooled to 120° Fahrenheit.

Next, the formaldehyde was added in the form of 62.70 grams of 37% active formaldehyde and the temperature during this addition was maintained between 120° and 130° Fahrenheit. As the formaldehyde was mixed with the previous solution the solution was heated to initiate the reaction and the temperature was controlled so that it was not allowed to go above about 180° Fahrenheit. As the reaction proceeded the viscosity of the solution was monitored using a Brookfield LVT viscosimeter where the samples were measured at temperatures of about 178° to 180° Fahrenheit. When the viscosity reading reached 38 to 40 cps, the desired degree of reaction was obtained. At this point, the reaction material was quenched by the addition of external cooling and 45.20 grams of de-ionized water and 7.8 grams of muriatic acid to obtain a final pH of 2.4 and to obtain a solids content of about 40.2% and a final viscosity of 246 cps.

A similar composition produced in accordance with U.S. Pat. No. 4,558,080 was available commercially as the product Klar-Aid 2400 produced by Dearborn Division, W. R. Grace & Co. This composition contained approximately 40% of a modified cationic tannin (mol. wt. about 10,000; charge density about 1.5–4.0) formed as the reaction product of Mimosa extract, formaldehyde, and monoethanolamine. The tannin-based product was used in the non-limiting examples which follow to demonstrate its relative effectiveness in combination with the other cationic component of this invention.

The second cationic polymer is selected from polymers derived from certain hydrophilic-lipophilic quaternary ammonium repeat units, and certain diallyldialkyl quaternary ammonium polymers. The hydrophilic-lipophilic quaternary ammonium repeat units which may be used in preparing the compounds used in this invention can be represented by the general formula:

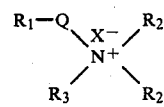

wherein $R_1$-Q is a lipophilic radical comprising an aliphatic hydrocarbon chain ($R_1$) having a carbon chain length between about 7 and about 28 carbon atoms, preferably between about 9 and 18 carbon atoms; and a linkage group (Q) for covalently linking the lipophilic chain $R_1$ to the quaternary nitrogen. Q is selected from the group consisting of benzyl groups (e.g.

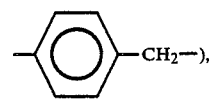

ester groups (e.g. —CO—O—CH$_2$—CH$_2$—), and amide groups (e.g. —CO—NH—CH(CH$_3$)—CH$_2$—); wherein each R$_2$ is independently selected from alkyl, hydroxy alkyl, or aryl groups of from 1 to 7 carbon atoms; wherein R is an ethylenically unsaturated hydrophilic group selected from acrylic ester groups of the formula CH$_2$=CR$_4$—CO—O—, where R$_4$ is hydrogen or methyl, acrylamide groups of the formula CH$_2$=CR$_5$—CO—NH—, where R$_5$ is hydrogen or methyl, vinyl pyrrolidone groups, and hydroxy ethyl methacrylate groups; and wherein X$^-$ is an anion.

The lipophilic radical, R$_1$-Q, may be saturated or unsaturated, straight chain or branched. A preferred R$_1$-Q radical is dodecylbenzylchloride. A preferred R$_2$ group is methyl.

R$_3$ is preferably an alkyl methacrylate; most preferably ethyl methacrylate.

Suitable anions (i.e. X$^-$) are provided by halides, alkyl sulphates, alkyl benzone sulphonates, phenoxy alkylene sulphates, and dialkyl sulphosuccinates. X$^-$ is preferably a halide.

The hydrophilic-lipophilic repeat units may be prepared in accordance with the well-known technology exemplified in U.S. Pat. Nos. 3,780,092 and 3,936,492 which are incorporated herein by reference; and the hydrophilic-lipophilic polymers of this invention may be conveniently provided by polymerizing the repeat units via the ethylenically unsaturated groups therein. Preferably, the hydrophilic-lipophilic polymer has a molecular weight between about 50,000 and 500,000, and a charge density between about 2.0 and 8.0 meq/g. Polymers having molecular weights of between about 80,000 and 150,000 are particularly preferred. Preparation of these hydrophilic-lipophilic polymers and the hydrophilic-lipophilic polymers as compounds are not part of this invention; and the hydrophilic-lipophilic polymer employed in the following non-limiting example was prepared by others and supplied to the inventor's employer.

EXAMPLE I

The effectiveness of the combination of this invention in detackifying paint overspray was evaluated using the paint spray apparatus depicted schematically in FIG. 1. The apparatus (10) comprises a spray chamber (12) which has a front wall (14), side walls (16) and (18), a rear wall (20) and a floor (22). An elevated reservoir (24) is positioned at the front wall (14) with the top edge (26) of the front wall forming the lowest side of the reservoir such that wastes overflowing from the reservoir form a water curtain for the front wall (14).

An outlet (28) is provided in the spray chamber floor (22), and water overflowing from the reservoir passes into outlet (28) and through piping (30) to the second mixing chamber (32). The mixing chamber (32) comprises end walls (34) and (36), side walls (38) and (40), and floor (42), and is divided into a first compartment (44) and a second compartment (46) by a weir (48). Water flowing from piping (30) flows into the first compartment, and an outlet (50) is provided in the floor of the second compartment. The top edge (52) of the weir terminates below the walls of the mixing chamber such that water overflows from the first compartment into the second compartment, and then into outlet (50). Piping (52) directs the water from outlet (50) into the third mixing chamber (54) which comprises four walls (56) (57) (58) and (59), and floor (60). The open end (61) of inlet piping (62) for pump (64) is positioned in the mixing chamber (54) such that the pump (64) can be used to withdraw water from the mixing chamber. Water pumped from the mixing chamber (54) is directed through pump outlet piping (65) into the elevated reservoir (24).

The top edge (21) of the rear wall (20) in spray chamber (12) terminates lower than the front top edge (26) of the front wall (14), and a paint spray gun (66) is positioned such that paint spray may be directed toward the front wall (14) from a distance of approximately nine inches. The capacity of the recirculating water system is about 14 liters and the recirculation rate is approximately 7.6 liters per minute.

In operation water circulation is begun to provide a curtain of water overflowing from top edge (26) toward floor (22) and passing adjacent to the front wall (14) of spray chamber (12). Paint is then sprayed from spray gun (66) toward the front wall (14) such that the spray becomes entrained in the water curtain. Generally, paint is sprayed at a rate within the range of from about 2.5 milliliters per minute to about 5.0 milliliters per minute, and the spraying continues until about 100 milliliters of paint has been sprayed.

The modified tannin was added to the recirculating paint spray booth water first and the pH elevated to about 8.5-10 using caustic. The second polymeric in the composition (i.e. diallyldimethylammonium chloride polymer or hydrophilic-lipophilic polymer) was then added and the treatment allowed to mix. The detackified paint solids, after paint spraying was commenced, were evaluated by rubbing them between thumb and forefinger. An excellent rating was interpreted as rendering complete detackification.

A series of 17 runs were made using the modified tannin/hydrophilic-lipophilic composition and spraying various high solid enamel automobile paints which had been prediluted with organic solvent blends in accordance with standard practice. In each run, about 1400 ppm modified tannin and about 500 ppm of the hydrophilic-lipophilic polymer (dodecylbenzyl dimethylethyl methacrylate ammonium chloride polymer with a charge density of about 4.3 and a molecular weight reportedly about 100,000) were added to the water. The water was adjusted to a pH of 10 using caustic After mixing of the treatment, a total of 100 milliliters of paint was sprayed, and the floating solids in the storage chamber examined and rated. The results are shown in Table I below:

TABLE I

| Run | Paint Color | Results |
| --- | --- | --- |
| 1 | White | Complete Detackification |
| 2 | Sapphire Metallic Blue | Complete Detackification |
| 3 | Black | Complete Detackification |
| 4 | Copper Metallic | Complete Detackification |
| 5 | Rosewood Metallic | Complete Detackification |
| 6 | Clear Coat | Complete Detackification |
| 7 | Brown Metallic | Complete Detackification |
| 8 | Red Metallic | Complete Detackification |
| 9 | Blue Metallic | Complete Detackification |
| 10 | Gray Metallic | Complete Detackification |
| 11 | Light Blue Metallic | Complete Detackification |
| 12 | Yellow | Complete Detackification |
| 13 | White | Complete Detackification |
| 14 | Black | Complete Detackification |
| 15 | Red | Fair Detackification |
| 16 | Clear Coat | Complete Detackification |
| 17 | Clear Coat | Complete Detackification |

These results can be compared with the following runs using a treatment of about 1400 ppm modified tannin and as another cationic agent, about 500 ppm of a polymer derived by reacting dimethylamine with epichlorohydrin (i.e. a DMA-EPI).

In one run about 1400 ppm modification and about 500 ppm dimethylamine-epichlorohydrin polymer were added to the water. The water was adjusted to a pH of 10 using caustic. After water circulation was begun, an undiluted white high solids base enamel paint was sprayed toward the water curtain in the spray chamber at approximately 3 milliliters per minute. After a total of 100 milliliters of paint had been sprayed, the floating solids in the storage chamber were examined and found to be completely detackified.

In a second run about 1400 ppm modified tannin and about 500 ppm dimethylamine-epichlorohydrin polymer were added to the water. The water was adjusted to a pH of 10 using caustic. After water circulation was begun, a blue sapphire metallic high solids enamel which had been prediluted with an organic solvent blend was sprayed toward the water curtain in the spray chamber. After a total of 100 milliliters of paint had been sprayed, the floating solids in the storage chamber were examined and found to be fair to poor. More particularly, the solids produced at this fairly heavy spray rate (3.0 ml/min) were sticky and smeared.

Thus, while the modified tannin and dimethylamine-epichlorohydrin combination was highly effective at detackifying undiluted high solids enamel paints, when prediluted paints from two automobile plants were screened, the effectiveness decreased markedly. In contrast, the modified tannin and hydrophilic-lipophilic polymer treatment of this invention was found to be extremely effective, even when the paints were diluted with organic solvent blends.

The Examples illustrate that the combinations of this invention remain effective for detackifying prediluted high solids enamel paints. Only in run 15, using a red high solids enamel, were the results less than total detackification, presumably due to the solvents present. The results in run 15 are, nevertheless, considered acceptable from a commercial standpoint. If the amino methylated tannin is used alone, the floating paint is tacky and is thus unacceptable for commercial application. If the hydrophilic-lipophilic polymer is used alone at elevated concentrations (e.g. 2,000 ppm), the paint is detackified but becomes completely dispersed throughout the water. Consequently, additional chemical treatment would be necessary for coagulation, flocculation, and subsequent sludge dewatering.

It is noted that the tannin-based component used in the examples was not considered a true solution, but more particularly, a hydrocolloidal suspension in which part of the molecule keeps the tannin in solution while the ethercyclic group is hydrophobic. As the water pH is raised above a level of about 6.5, the solubility of the tannin-based component decreases and a small floc is formed. Accordingly, after addition of the tannin to the water of the paint spray apparatus, the pH is preferably brought within the range of about 8 to 11 to encourage formation of such a floc.

With regard to the modified tannin component, it is further noted that while the preferred tannin-based component has been described above, it is understood that other modified tannins may be prepared by aqueous reaction of a tannin with an amino compound and an aldehyde. Mimosa extract is shown above to produce a particularly suitable floc former, but both quebracho extract and wattle extract are preferred from the standpoint of availability and proven suitability as floc-forming reactants. Other suitable tannins can be obtained from various wood and vegetation materials found throughout the world. Tannins are, in fact, a large group of water-soluble, complex organic compounds. Almost every tree or shrub that grows contains some tanins in the leaves, twigs, barks, wood, or fruit. Examples of barks are wattle, mangrove, oak, eucalyptus, hemlock, pine, larch, and willow. Examples of woods are the quebracho, chestnut, oak and urunday.

Examples of fruits are myrobalans, valonia, divi-divi, tara, and algarrobilla. Examples of leaves are sumac and gambier and examples of roots are canaigre and palmetto. The tannin extracts of many of these materials, and in particular the condensed polyphenolic tannin extracts, are thought to be sufficiently reactive to provide adequate flocculant qualities.

The preferred aldehyde for preparing the modified tannin used in this invention is formaldehyde which can be used in the form of 37% active formaldehyde solution. This is also commercially available as formalin which is an aqueous solution of 37% formaldehyde which has been stabilized with from 6–15% methanol. Other commercial grades of formaldehyde and its polymers could be used. Such commercial grades include 44, 45, and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves.

Other aldehyde containing or generating reactants are organic chemical compounds which contain at least one aldehyde group therein, as are well-known and include, for example, formaldehyde, acetaldehyde, propionaldehyde, glycolaldehyde, glyoxylic acid and the like or polyaldehydes, i.e. organic compounds having more than one aldehyde group in the compound, such as glyoxal, paraformaldehyde and the like. Other suitable aldehyde reactants include aldehyde generating agents, i.e. known organic compounds capable of forming an aldehyde group in site, such as melamine-formaldehyde monomeric products and derivatives such as tri and hexamethylol melamine and the tri and hexa ($C_1$–$C_3$ alkoxymethyl) melamine. Such materials can be formed by known conventional methods. The alkyl blocked derivatives are commercially available, are stable to self-polymerization and are, therefore, preferred.

Particularly preferred are amino compounds that include monoethanolamine, ammonia and water soluble inorganic ammonium salts such as ammonium chloride. Other preferred materials include primary amines such as monoethanolamine, methylamine and ethylamine. Secondary amines and other amine compounds are also acceptable. The primary amines are preferred for preparing the modified tannin since they are the more reactive amines than secondary or tertiary amines.

The hydrophilic-lipophilic polymer component appears to stabilize the small floc, and can even decrease its size. This component is preferably added after the modified tannin to allow the small floc to form before stabilization. Without limiting the invention to a particular theory of operation, the addition of the hydrophilic-lipophilic polymer component is considered important for providing a floc with relatively high surface area, thereby improving detackification by facilitating contact between the floc which is dispersed in water circulating in the paint spray apparatus, and paint which becomes entrained therein. This stabilization, together with the higher charged floc, improves the dispersion of the floating paint. Flotation of the waste solids is also facilitated since the settling velocity of the floc is reduced by addition of the hydrophilic-lipophilic polymer component of this invention. Thus, the detackified paint particles produced in accordance with this invention are preferably collected by conventional flotation.

An important benefit of producing detackified paint which floats is that some of the resulting sludges, such as those obtained with certain high solids base coats, are easily dewatered even without further chemical treatment. For example, a sludge containing more than 94% solids was mechanically obtained using a laboratory plate and frame press. Nevertheless, following detackification of the water-entrained paint in accordance with this invention, and removal of the detackified particles from the system, as by flotation, further chemical treatment may be provided to dewater the sludge. For example, for high solids enamel clear coat paint waste, conventional nonionic or anionic polymeric flocculants such as an anionic polyacrylamide polymer can be advantageously used to enhance sludge dewaterability.

Organic solvents used for predilution of enamel paints may include, for example, methylethyl ketone, hexane, xylene, toluene, acetone, butanol, or a combination of these and other conventional paint solvents. The hydrophilic-lipophilic quaternary ammonium polymer as defined above also possess surfactant properties which are considered to contribute to their unique capability to detackify prediluted, ready to spray, high solids enamel paints such as those commonly used in the automobile industry. Moreover, these hydrophilic-lipophilic polymers may even be considered superior to many commonly used surfactants because they do not generally contribute to foaming. Without limiting this invention to a particular theory of operation, the effectiveness of this component in the combination is considered directly attributible to its hydrophilic-lipophilic nature. The lipophilic radical $R_1$-Q is believed to form a micelle with solvents such as methyl ethyl ketone and toluene. Detackification is considered to be facilitated as a result of such effective isolation of the solvents from the paint matrix.

As indicated above, the second component of the treatment combination of this invention may also comprise diallyldialkyl quaternary ammonium polymers. These polymers are generally halides, especially chlorides. The preferred diallyldialkyl quaternary ammonium halide polymer is polydiallyldimethyl ammonium chloride such as the diallyldimethyl ammonium chloride polymers disclosed in U.S. Pat. No. 3,288,770 which is hereby incorporated herein by reference. These polymers may be prepared, for example, by polymerizing diallyldimethylammonium chloride monomer, using butylhydroperoxide as a free radical catalyst. Typically, when diallyldimethyl quaternary ammonium polymers are used in accordance with this invention, they have a molecular weight range between about 100,000 and 300,000 and a charge density between about 4.0 and 8.0. One product (charge density about 6.6; molecular weight about 200,000) is available from Dearborn Division, W. R. Grace & Co. as Aquafloc 459, and was used in the Examples which follow.

The combination of the tannin-based component and diallyldimethyl quaternary ammonium polymer to treat water containing paint overspray in accordance with this invention is considered particularly effective when the overspray is an epoxy resin paint. Practice of this embodiment of the invention will be further apparent from the following non-limiting Example.

EXAMPLE II

The apparatus of FIG. 1 was used in the general manner described in Example I. In a first run of this example, however, about 1400 ppm of the modified tannin and about 100 ppm of diallyldimethylammonium chloride polymer (i.e., a DADMAC) were added to the water circulating in the paint spray apparatus. The water was adjusted to a pH of 10 using caustic (50%). After water circulation was begun, a clear coat enamel paint, reduced for spraying with methylethyl ketone, was sprayed toward the water curtain in the spray chamber at approximately 3.3 milliliters per minute. After a total of 100 milliliters of reduced paint had been sprayed, the floating solids in the paint spray booth were examined. It was estimated that less than 50% detackification was achieved. The results were considered at least as poor as the run using amine epihalohydrin with prediluted paint described above. Accordingly, the diallyl-dimethylammonium chloride/modified tannin combination was considered a poor treatment for diluted high solids enamel paint systems.

A second run was made using the same procedure as the first run, except that a off-white (base) enamel paint was used at an application rate of 3.3 ml/min. A total of 100 ml paint was sprayed. This high solids enamel paint was not prediluted with solvents prior to spraying. The floating solids produced in this run were considered to be completely detackified. These results were superior to those achieved using the dimethylamine-epichlorohydrin/modified tannin combination.

A third run was made using the same procedure as the first run, except that a black modified epoxy resin was used. The application rate was the same as that described above. The floating solids produced in this run were considered to be completely detackified.

The results of these Example II runs demonstrate that the diallyldimethylammonium chloride/modified tannin combination in accordance with this invention can be used advantageously to detackify certain paint systems. In the first run of Example II, this combination was relatively poor in treating prediluted high solids enamel paint. This is generally comparable with certain other cationic combinations tested, such as DMA-EPI modified tannin combination, and further accentuates the value of the hydrophilic-lipophilic polymer/modified tannin combinations of this invention.

In the second run of Example II, using a high solids enamel paint which was not prediluted, excellent results were achieved. A combination of the same tannin-based product with a DMA-EPI polymer was also used on this paint with good detackification results. Sludge dewaterability was tested for the solids produced by each of the two treatment combinations using a laboratory plate and frame press. It was found that the combination using DADMAC/modified tannin provided a dewatered sludge of 82% solids, whereas the combination using DMA-EPI/modified tannin provided a sludge of 75% solids. Accordingly, the combination of this invention was considered superior in terms of sludge dewaterability. It is noted, however, that in contrast to the sludge produced by the hydrophilic-lipophilic polymer/modified tannin combinations of this invention, the filter mesh of the laboratory press was blinded during the dewatering. It was concluded that precoating of field filter presses with materials, such as diatomaceous earth, would be required when dewatering paint solids detackified by this combination.

The third run of Example II confirms that the diallyldimethylammonium chloride/modified tannin combination of this invention is especially effective for epoxy resin paints.

Epoxy resin paints are regarded in the art to be relatively easy to detackify when compared to diluted high solids enamel paints. The diallyldimethyl quaternary ammonium polymer particularly when highly charged appears to stabilize the formation of a pin floc by the tannin-based component, therefore decreasing its size. Without limiting the invention to a particular theory of operation, the addition of the diallyldimethyl quaternary ammonium polymer is considered important for providing a floc with relatively high surface area and dispersing it, thereby improving detackification by facilitating the contact between the floc which is dispersed in water circulating in the paint spray apparatus, and paint which becomes entrained therein. The resulting detackified paint then forms a floating sludge.

Generally, the modified tannin component is added to the paint spray apparatus water at a concentration of at least about 500 ppm, preferably between about 1000 ppm and 5000 ppm. The hydrophilic-lipophilic polymer, when used as the second component, is generally added at a concentration of at least about 300 ppm, preferably between about 500 ppm and about 1500 ppm; while the diallyldialkyl quaternary ammonium polymer, when used as the second component, is generally added at a concentration of at least about 50 ppm, preferably between about 100 ppm and about 500 ppm. The two components are preferably used in a weight ratio of tannin to second component of between about 2:1 and 5:1 when the second component is the hydrophilic-lipophilic polymer; and between about 2:1 and 10:1 when the second component is the DADMAC. The two components are preferably added separately to the water being treated, with the tannin being added first. However, compositions comprising both components, particularly in the proportions recited above, can be mixed prior to treatment and then used advantageously to treat spray booth wastewater, and accordingly, are considered to be within the scope of this invention. Such compositions typically contain between 1 and 30, preferably between 1 and 10 weight percent, total, of the two components of this invention in an aqueous composition. The storage stability of particular compositions of this invention may limit the length of time between mixing of components and effective use.

The combinations of this invention are preferably free of clays so as to avoid dewatering problems associated with clay materials. The combinations of this invention are also preferably free of amphoteric metals, particularly zinc, which provide disposal concerns when the detackified solids are removed from the paint spray facility. Indeed, the preferred combinations of this invention are organic in nature, and may advantageously consist essentially of the two components discussed above.

The invention described herein is considered effective for detackifying high solids enamel paints (both diluted and non-diluted), epoxy resin paints, and also polyurethane paints. It is considered preferable that the paint spray booth water have an alkalinity of at least about 150 ppm as $CaCO_3$ when high solids enamel paints are detackified in accordance with this invention.

The examples described herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method of detackifying spray booth water containing particles from paint spray comprising the steps of:
   (a) adding to the spray booth water at least about 500 ppm of modified tannin compounds formed by reacting a condensed tannin with both an amino compound and an aldehyde;
   (b) adding to the spray booth water at least about 300 ppm of polymers derived from hydrophilic-lipophilic quaternary ammonium repeat units of the formula:

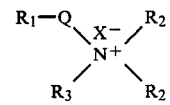

wherein $R_1$-Q is a lipophilic radical including $R_1$ which comprises an aliphatic hydrocarbon chain having a carbon chain length between about 7 and about 28 carbon atoms and Q, which is a linkage group selected from the group consisting of benzyl groups, ester groups, and amine groups that covalently links the lipophilic chain of $R_1$ to the quaternary nitrogen; wherein each $R_2$ is independently selected from alkyl, hydroxy alkyl, or aryl groups of from 1 to 7 carbon atoms; wherein $R_3$ is an ethylenically unsaturated hydrophilic group selected from acrylic ester groups of the formula $CH_2$—$CR_4$—CO—O—, where $R_4$ is hydrogen or methyl, acrylamide groups of the formula $CH_2$—$CR_5$—CO—NH—, where $R_5$ is hydrogen or methyl, vinyl pyrrolidone groups, and hydroxy ethyl methacrylate groups; and wherein $X^-$ is an anion;
   (c) providing a pH above about 6.5 in the spray booth water such that modified tannin added in step (a) forms a floc which is dispersed in the spray booth water for detackification, with the polymer added in step (b) stabilizing such floc and improving detackification and
   (d) separating the floc and paint particle from said spray booth water.

2. The method of claim 1 wherein the spray booth water contains particles from spray of high solids enamel paint diluted with organic solvent.

3. The method of claim 2 wherein between about 500 and about 1500 ppm of said hydrophilic-lipophilic quaternary ammonium polymer is added during step (b).

4. The method of claim 3 wherein the organic solvent includes methylethyl ketone, xylene, toluene, acetone, butanol, or a combination of these.

5. The method of claim 3 wherein the hydrophilic-lipophilic quaternary ammonium polymer is derived from dodecylbenzyldimethylethylmethacrylate ammonium chloride.

6. The method of claim 1 wherein said modified tannin is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

7. The method of claim 6 wherein between about 1,000 and 5,000 ppm of said tannin is added during step (a).

8. The method of claim 7 wherein the tannin used in producing the first component is extracted from quebracho wood or wattle bark; the amino compound used is monoethanolamine, methylamine, or ammonium chloride; and the aldehyde used is formaldehyde.

9. The method of claim 8 wherein the spray booth water contains particles from diluted or non-diluted high solids enamel paint spray.

10. The method of claim 9 wherein between about 500 ppm and 1,500 ppm of dodecylbenzyldimethylethylmethacrylate ammonium chloride polymer are added.

11. The method of claim 10 wherein the polymers added at step (b) have a molecular weight between about 50,000 and 500,000 and a charge density of between about 2.0 and 8.0 meq/g.

12. The method of claim 11 the compound added at step (a) has a molecular weight between about 5,000 and 50,000 and a charge density of between about 0.7 and 5.0 meq/g.

13. The method of claim 9 wherein the paint spray booth water has an alkalinity of at least about 150 ppm as $CaCO_3$.

14. The method of claim 1 wherein no amphoteric metals are added during detackification.

15. The method of claim 1 wherein the polymer of step (a) and the polymer of step (b) are added as an aqueous composition containing between about 1 and 30 weight percent total of said polymers.

16. The method of claim 1 wherein the spray booth water contains particles from epoxy resin or polyurethane paint.

17. The method of claim 1 wherein the spray booth water has a pH between about 8 and 11.

18. The method of claim 1 wherein the detackified particles are collected by flotation and dewatered without further chemical addition.

19. The method of claim 1 wherein the molecular weight of said hydrophilic-lipophilic quaternary ammonium polymer is between about 80,000 and 150,000.

20. The method of claim 19 wherein the charge density of said hydrophilic-lipophilic quaternary ammonium polymer is between about 2 and 9 meq/g.

21. The method of claim 18 wherein the molecular weight of said hydrophilic-lipophilic quaternary ammonium polymer is about 100,000.

22. The method of claim 18 wherein the hydrophilic-lipophilic quaternary ammonium polymer is a reaction product of dimethylaminoethylmethacrylate and dodecylbenzyl chloride.

23. The method of claim 1 wherein said modified tannin compounds are added to the spray booth water prior to said hydrophilic-lipophilic quaternary ammonium polymers.

24. A method of detackifying spray booth water containing particles from paint spray, wherein the spray booth water contains particles from epoxy resin, polyurethane, or non-diluted high solids enamel paint spray, comprising the steps of:
(a) adding to the spray booth water at least about 500 ppm of modified tannin compounds formed by reacting a condensed tannin with both an amino compound and an aldehyde;
(b) adding to the spray booth water at least about 50 ppm of diallyldialkyl quaternary ammonium polymers, wherein the polymers have a molecular weiqht between about 100,000 and 300,000 and a charge density between about 4.0 and 8.0 meq/g;
(c) providing a pH above about 6.5 in the spray booth water such that the modified tannin added in step (a) forms a pin floc which is dispersed in the spray booth water for detackification, with the polymer added in step (b) stabilizing said floc and improving detackification and
(d) separating the floc and paint particles from said spray booth water.

25. The method of claim 24 wherein the modified tannin is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150 to 200 Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180 Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

26. The method of claim 25 wherein between about 1,000 ppm and 5,000 ppm of said tannin is added during step (a).

27. The method of claim 26 wherein the tannin used in producing the first component is extracted from quebracho wood or wattle bark; the amino compound used is monoethanolamine, methylamine, or ammonium chloride; and the aldehyde used is formaldehyde.

28. The method of claim 26 wherein the paint spray booth water has an alkalinity of at least about 150 ppm as $CaCO_3$.

29. The method of claim 28 wherein between about 1,000 ppm and 5,000 ppm of said tannin is added during step (a).

30. The method of claim 24 wherein between about 100 ppm and 500 ppm of diallyldimethylammonium chloride polymer having a molecular weight between about 100,000 and 300,000 is added during step (b).

31. The method of claim 24 wherein no amphoteric metals are added during detackification.

32. The method of claim 24 wherein the polymer of step (a) and the polymer of step (b) are added as an aqueous composition containing between about 1 and 30 weight percent total of said polymers.

33. The method of claim 24 wherein the spray booth water has a pH between about 8 and 11.

34. The method of claim 24 wherein the detackified particles are collected by flotation and dewatered without further chemical addition.

35. The method of claim 24 wherein said modified tannin compounds are added to the spray booth water prior to said diallyldialkyl quaternary ammonium polymers.

* * * * *